(12) United States Patent
Pulugurta

(10) Patent No.: US 8,249,498 B1
(45) Date of Patent: Aug. 21, 2012

(54) SELECTIVE SERVICE-TOGGLING IN A WIRELESS COMMUNICATION SYSTEM

(75) Inventor: Srikanth Pulugurta, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 318 days.

(21) Appl. No.: 12/749,794

(22) Filed: Mar. 30, 2010

(51) Int. Cl.
| | |
|---|---|
| H04H 20/71 | (2008.01) |
| H04W 36/00 | (2009.01) |
| H04W 40/00 | (2009.01) |
| H04W 4/00 | (2009.01) |
| H04B 15/00 | (2006.01) |
| H04B 17/00 | (2006.01) |
| H04B 7/216 | (2006.01) |

(52) U.S. Cl. ......... 455/3.03; 455/442; 455/62; 455/436; 455/439; 370/335; 370/342; 370/328; 370/329; 370/441

(58) Field of Classification Search .................. 455/3.03, 455/442, 62, 436, 439; 370/335, 342, 328, 370/329, 441
See application file for complete search history.

(56) References Cited

U.S. PATENT DOCUMENTS

| | | | |
|---|---|---|---|
| 6,563,809 B1 | 5/2003 | Proctor, Jr. et al. | |
| 7,519,077 B2* | 4/2009 | Beathard | 370/447 |
| 7,848,282 B2* | 12/2010 | Padovani et al. | 370/329 |
| 8,040,803 B1* | 10/2011 | Pawar et al. | 370/231 |
| 8,107,438 B1* | 1/2012 | Singh et al. | 370/332 |
| 2007/0242702 A1* | 10/2007 | Shim | 370/516 |
| 2008/0026715 A1* | 1/2008 | Gao | 455/187.1 |
| 2008/0049706 A1* | 2/2008 | Khandekar et al. | 370/342 |
| 2008/0066161 A1* | 3/2008 | Ohhira | 726/4 |
| 2009/0086629 A1* | 4/2009 | Zhang et al. | 370/230 |
| 2009/0170547 A1* | 7/2009 | Raghothaman et al. | 455/522 |
| 2009/0257361 A1* | 10/2009 | Deshpande et al. | 370/252 |
| 2009/0285159 A1 | 11/2009 | Rezaiifar et al. | |
| 2011/0305197 A1* | 12/2011 | Park et al. | 370/328 |

* cited by examiner

Primary Examiner — Bobbak Safaipour

(57) ABSTRACT

A method to selectively restrict certain wireless communication devices (WCDs) from attempting to access a radio access network is disclosed. In example operation, a wireless carrier will provision a proper subset of its subscriber WCDs with a special access-toggle flag or associated logic, while other subscriber WCDs of the wireless carrier will not be so provisioned. When and where the wireless carrier wishes to prevent the subset of WCDs from attempting to access the wireless carrier's system, the wireless carrier will then broadcast an access-off command that will be interpreted by the devices with the access-toggle flag/logic as meaning that they should not seek to access the wireless carrier's system, but that will be disregarded (or at least not so interpreted) by the subscriber WCDs without the access-toggle flag/logic.

20 Claims, 4 Drawing Sheets

SELECTIVE SERVICE-TOGGLING IN A WIRELESS COMMUNICATION SYSTEM

BACKGROUND

To provide cellular wireless communication service, a wireless service provider or "wireless carrier" typically operates a radio access network (RAN) that defines one or more coverage areas in which wireless communication devices (WCDs) can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which WCDs can operate. Further, the RAN may include one or more radio network controllers (RNCs) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other WCD that is positioned within coverage of the RAN can then communicate with a BTS and in turn, via the BTS, with other served devices or with other entities on the transport network.

Wireless communications between a WCD and a serving BTS in a given coverage area will typically be carried out in accordance with an agreed air interface protocol that defines a mechanism for wireless exchange of information between the WCD and BTS. Examples of such protocols include CDMA (e.g., 1xRTT, 1xEV-DO), iDEN, WiMAX (e.g., IEEE 802.16), LTE, TDMA, AMPS, GSM, GPRS, UMTS, or EDGE, and others now known or later developed.

The air interface protocol will generally define a "forward link" encompassing communications from the BTS to WCDs and a "reverse link" encompassing communications from WCDs to the BTS. Further, each of these links may be structured to define particular channels, through use of time division multiplexing, code division multiplexing (e.g., spread-spectrum modulation), frequency division multiplexing, and/or some other mechanism.

The forward link, for example, may define (i) a pilot channel on which the RAN may broadcast a pilot signal to allow WCDs to detect wireless coverage, (ii) system parameter channels (e.g., a sync channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs. And the reverse link, for example, may define (i) access channels on which WCDs may transmit "access probes" such as registration messages and call origination requests, and (ii) traffic channels on which WCDs may transmit bearer traffic for receipt by the RAN.

Certain air interface channels may be arranged to carry communications in a time division multiplexed manner, so that multiple WCDs can share the channel. As such, those channels may have a limited capacity in the form of limited number of time slots that can be allocated for use by WCDs. Through engineering design, taking into account expected use, a sufficient number of such channels and sufficient channel capacity may be provided. However, in some situations, a communication channel can nevertheless become overloaded, which can unfortunately create issues with network performance.

The reverse link access channel is a good example of this issue.

Under certain air interface protocols, an access channel in each coverage area is divided into series of time slots that can be used to carry access probes so as to allow WCD registration, call origination, and other functionality. In typical practice, when a WCD is going to send an access probe to the BTS, the WCD will randomly select one of the access channel time slots and send the access probe in that time slot. Normally, the random nature of this selection will minimize the chance that two WCDs in the coverage area will transmit access probes at the same time (in the same time slot). However, at times when the coverage area is in heavy use, there is an increased chance that two or more WCDs will transmit access probes at the same time. When that happens, the access probes may collide with each other, and as a result neither access probe may successfully reach the BTS. If this problem persists, a WCD may ultimately conclude that it is unable to communicate with the BTS, which may lead to roaming and poor user experience.

OVERVIEW

In general, high access channel occupancy (load) may occur in a coverage area when many WCDs that subscribe to service from the wireless carrier are seeking to register with the serving RAN or are sending access probes for other reasons.

In addition, however, it turns out that access probe transmissions from WCDs that do not currently subscribe to service from a wireless carrier may also contribute to the access channel occupancy problem. This may be the case where such non-subscriber devices power on or move into the wireless carrier's coverage area and for some reason (notwithstanding the fact that they do not subscribe to service with the wireless carrier) scan for and detect a pilot from the wireless carrier and then responsively attempt to register with the RAN.

A good example of such "rogue" devices are embedded telemetry devices of the type commonly used for network performance monitoring and planning. In common practice, a wireless carrier may arrange with companies that employ vehicle fleets (e.g., parcel delivery services, taxi companies, etc.) to equip the company's vehicles with WCDs that function to test and wirelessly report network performance as the vehicles drive throughout an area. Each such "drive test" device is typically installed in an inconspicuous place in a vehicle and is coupled with the vehicle's power system, so that the device can operate in a non-obtrusive manner as the vehicle drives throughout a region of interest. Further, the drive test device will typically be set up as a subscriber device in the wireless carrier's authorization system so that, when the RAN receives a registration request from the drive test device, the RAN will grant the request and thus allow the drive test device to be served by the RAN.

In normal operation, embedded telemetry devices like this will behave much like any other WCD with respect to the access channel, by sending one or more access probes to register with the RAN upon power-on or upon moving into a new coverage area or encountering another designated registration trigger. Since the embedded telemetry devices are authorized to register with the RAN, the RAN will grant the registration requests that it receives from the such devices, so that the devices can then acquire wireless network connectivity and can thereby report network performance metrics.

Embedded telemetry devices can become "rogue" (non-subscriber) devices when the wireless carrier removes the devices from the wireless carrier's authorization system, thereby rendering the devices unauthorized and thus unable to successfully register with the RAN, but when the devices then still attempt to register with the RAN. This may occur, for instance, if the wireless carrier terminates its relationship with a given fleet company and therefore removes those devices from the carrier's authorization system. As it may be costly to uninstall or even unplug the embedded telemetry devices from all of the fleet vehicles, the devices may continue to attempt registration with the RAN each time the vehicles are powered on or in other situations. Even though the registration attempts by such unauthorized devices will fail, the access probes that the devices send in an effort to register will consume valuable access channel capacity.

Other examples of rogue devices impacting access channel capacity may be possible as well. For instance, any WCD that is programmed with a preferred-roaming-list (PRL) that specifies the wireless carrier's system may have a tendency to scan for coverage from the wireless carrier and, upon detecting such coverage, to attempt registration by transmitting one or more access probes on the wireless carrier's access channel. WCDs that subscribe to service from other service providers may be programmed with such a PRL to facilitate roaming to the wireless carrier's system. If the wireless carrier terminates a roaming agreement with such another service provider, and if those WCDs for some reason do not get provisioned with an updated PRL, the WCDs may still scan for and attempt registration with the wireless carrier's network, only to fail. In this case, as with terminated embedded telemetry devices, valuable access channel capacity in the wireless carrier's network would be consumed for no good reason.

One way for a wireless carrier to help prevent rogue devices, particularly rogue telemetry devices, from attempting to access the wireless carrier's network is for the wireless carrier to provision the devices with a dummy PRL that does not list the wireless carrier's system. The wireless carrier may do this through over-the-air-provisioning (OTAP) before deactivating the devices (e.g., while the devices still have connectivity with the wireless carrier's network, before the wireless carrier has removed the devices from the wireless carrier's authorization system). Because the dummy PRL would not list the wireless carrier's system, the deactivated WCDs would no longer attempt to access the wireless carrier's system, and thus access channel resources would be conserved.

A problem with that solution, however, is that if the wireless carrier ever desires to reactivate the devices (e.g., enters into a new agreement with a terminated fleet company, to restart use of drive test devices that are installed in the company's vehicles), the wireless carrier would have no way to activate the devices over the air, because the devices would no longer be able to access the wireless carrier's network. Therefore, the solution is not so desirable.

Disclosed herein is an improved method to help overcome this problem. In accordance with the method, a wireless carrier will provision a proper subset of its subscriber WCDs (e.g., those WCDs that are going to be deactivated or otherwise have their access-authorization terminated) with a special access-toggle flag or associated logic, while other subscriber WCDs of the wireless carrier will not be so provisioned. When the wireless carrier wishes to prevent the subset of WCDs from attempting to access the wireless carrier's system, the wireless carrier will then broadcast an access-off command that will be interpreted by the devices with the access-toggle flag/logic as meaning that they should not seek to access the wireless carrier's system, but that will be disregarded (or at least not so interpreted) by the subscriber WCDs without the access-toggle flag/logic.

Optimally, the wireless carrier may broadcast the access-off command in a system parameter message, such as a sync channel message, that WCDs are generally arranged to read before they attempt access. Thus, upon reading that message and detecting the access-off command, devices that have been provisioned with the access-toggle flag/logic will forego attempting access, thereby helping to conserve access channel capacity. Whereas, upon receiving that message, devices that are not provisioned with the access-toggle flag/logic may disregard the access-off command and may thus still seek access to the system.

Advantageously with this process and arrangement, the wireless carrier can maintain control over when, and perhaps where, the WCDs that have been provisioned with the access toggle flag/logic will attempt to register with the wireless carrier's system. If reason exists to allow the WCDs to attempt access at a particular time or place, the wireless carrier may simply not broadcast the access-off command, or may broadcast an access-on command. The wireless carrier may thus selectively allow or disallow those WCDs to attempt access to the wireless carrier's system at particular times or in particular coverage areas (e.g. particular sectors) by selectively changing or omitting the broadcast access command. Further, the wireless carrier may selectively allow or disallow attempted access by such devices based on other factors as well. For instance, the wireless carrier may disallow access attempts by the devices whenever access channel occupancy is at a threshold high level. Other examples are possible as well.

These as well as other aspects, advantages, and alternatives will become more apparent to those of ordinary skill in the art by reading the following detailed description with reference where appropriate to the accompanying drawings. Further, it should be understood that the description provided in this document, including the foregoing overview, is intended as an example only and is not intended to limit the scope of the invention as claimed.

DETAILED DESCRIPTION

Figure 1:
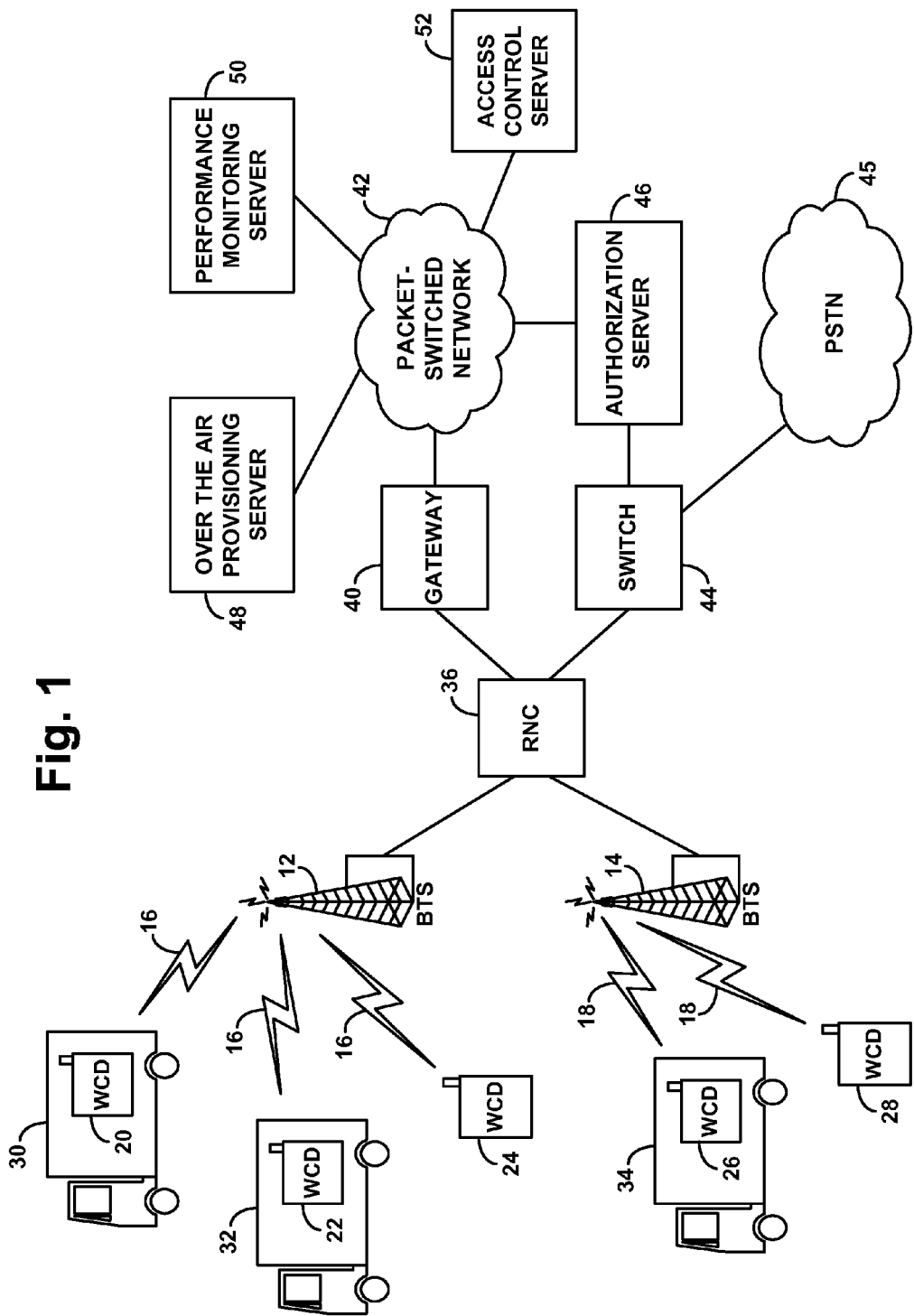
FIG. 1 is simplified block diagram of a wireless communication system in which the present method can be implemented.

The present method may be implemented by a wireless carrier that operates a RAN arranged to serve WCDs with wireless communication service. FIG. 1 is a simplified block diagram depicting an example of such an arrangement in which a RAN includes two representative BTSs 12, 14 each radiating to define one or more coverage areas 16, 18 in which WCDs can operate. For simplicity, the figure depicts three representative WCDs 20, 22, 24 in coverage of BTS 12, and two representative WCDs 26, 28 in coverage of BTS 14, and the figure shows WCDs 20, 22 and 26 being installed as embedded telemetry devices in trucks 30, 32, 34. In practice, as noted above, the wireless carrier may at one point have an arrangement with the operator of these trucks to allow operation of the carrier's embedded telemetry devices in the operator's vehicle's, so that the devices can conveniently collect and report wireless network performance data as the trucks drive throughout a region. However, the wireless carrier may then terminate that arrangement, and the embedded telemetry devices may then become rogue devices that undesirably consume the wireless carrier's access channel capacity.

As further shown in the figure, BTSs 12, 14 are coupled with an RNC 36, which functions to control various aspects of BTS operation and various aspects of air interface operation, such as handoffs of WCDs between BTSs and the like. RNC 36 is then coupled with a gateway 40, such as a packet data serving node (PDSN), that provides connectivity with a packet-switched network 42 such as a core packet network operated by the wireless carrier and/or the public Internet. And RNC 36 is coupled with a switch 44, such as a mobile switching center (MSC), that provides connectivity with the PSTN 45

Shown sitting as nodes on the packet-switched network are an authorization server 46, an over-the-air provisioning (OTAP) server 48, a performance monitoring server 50, and an access control server 52. Each of these servers may comprise one or more computers or computerized systems having one or more processors and associated components arranged to carry out various functions as described.

Generally, authorization server 46 functions to maintain or manage records of WCDs that are authorized to be served with wireless communication service by the wireless carrier. This includes WCDs that are associated with active service accounts of users who subscribe to service with the wireless carrier (i.e., WCDs that subscribe to service with the wireless carrier). Further, this includes embedded telemetry devices and other WCDs that are for one reason or another authorized to be served by the wireless carrier.

In practice, when any such WCD gets authorized to be served by the wireless carrier (e.g., at the time of purchase or installation), authorization server 46 may be directed to establish or update a record for the WCD to indicate that the WCD is authorized and should be allowed to access the network, possibly with certain limitations. Further, when a WCD that is currently authorized to be served by the wireless carrier becomes unauthorized (e.g., its associated subscriber account with the wireless carrier gets terminated), authorization server 48 may be directed to update the record for the WCD to indicate that the WCD is no longer authorized and therefore should not be allowed to access the network, or authorization server 46 may simply delete the record for the WCD.

OTAP server 48 functions to provide WCDs with new and updated program logic and associated data, such as PRLs, firmware, telephone number assignments, server addresses, and the like. The OTAP server may send such data to WCDs as packet-data, after first sending signaling messages (e.g., Short Messaging Service (SMS) messages) to cause the WCDs to acquire wireless packet-data connectivity. Alternatively, the OTAP server may send the data to the WCDs in other ways, such as in one or more SMS messages for instance. Preferably, each WCD that is arranged to be served by the wireless carrier is programmed with core OTAP logic to be able to receive such OTAP communications and to store or otherwise implement the updates provided.

In general practice, when a WCD subscribes to be served by the wireless carrier, the WCD may register with the wireless carrier whenever the WCD enters into coverage of the wireless carrier's RAN, or when the WCD moves from one coverage area to another. For instance, in the arrangement of FIG. 1, when WCD 22 enters into coverage area 16 of BTS 12, the WCD may detect a pilot signal being broadcast by the BTS on a forward link pilot channel of the coverage area. In response, the WCD may then read a system parameter message, such as a sync channel message for instance, to learn operational parameters of the detected coverage area, such as any special procedures to use when seeking access. And the WCD may then transmit a registration request in an access probe to the BTS on a reverse link access channel. Further, if the access probe transmission is not successful, the WCD may retransmit the access probe, and the WCD may repeat the retransmission up to a threshold number of times until the transmission succeeds.

Upon successful receipt of the access probe, BTS 12 may forward the registration request to RNC 36, which may in turn forward the request to switch 44. Switch 44 may then communicate with authorization server 48 (e.g., the switch may communicate with a home location register (HLR) that in turn communicates with the authorization server) to determine whether the WCD seeking registration is authorized to be served with wireless communication service. If so, the switch may send a registration success message in response to the WCD, and the RAN may update its records to indicate that the WCD is currently operating in coverage area 16 or generally in coverage of switch 44, to facilitate later communications to the WCD.

Further, once a WCD is registered with the wireless carrier, the WCD may acquire wireless packet data connectivity if the WCD is so equipped. To do so, for instance, the WCD may transmit a packet-data origination request or connection request in an access probe to the serving BTS, again on a reverse link access channel. Assuming the WCD is authorized to engage in such communication, the RAN may then assign air interface resources (e.g., an air interface traffic channel or address) for use by the WCD. The WCD may then also acquire an Internet Protocol (IP) address for use to engage in communication on the packet-switched network and may proceed to engage in packet-data communication with other entities on the network.

Performance monitoring server 50 functions to collect and manage performance monitoring metrics reported by WCDs such as embedded telemetry devices 20, 21, 26 for instance. In practice, those WCDs may collect performance monitoring data (e.g., RF signal strength per location and call block/drop event data) and send that data through packet-data communication to the performance monitoring server 50. Through automated or manual analysis of that data, the wireless carrier may then determine that RF performance issues exist in one location or another in the carrier's network and may responsively take action to improve performance.

Access control server 52 functions in accordance with the present method to provide for delivery of access-toggle flags/logic to WCDs that are to be subject to access toggling, and perhaps further to manage when and where the RAN will broadcast access-off commands to selectively prevent such WCDs from attempting access while allowing WCDs that are not subject to access toggling to freely attempt access.

In practice, access control server 52 may take action in response to manual or automated triggering. For instance, when an engineer, salesperson, administrator, or other person at the wireless carrier terminates the authorization of a WCD to be served by the wireless carrier (e.g., upon termination of a drive-test monitoring contract with a fleet company), the person may enter a command into the access control server or into another entity (e.g., the authorization server) that may responsively signal to the access control server. The access control server may then send the access-toggle flag/logic to the WCD. Alternatively or additionally, if another computer system programmatically determines for one reason or another that the authorization of the WCD should be terminated (e.g., in response to non-payment of invoices in an account of the WCD), the computer system may responsively signal to the access control server 52, and the access control server 52 may then send the access-toggle flag/logic to the WCD.

A WCD can be provisioned with the access-toggle flag/logic in any of a variety of ways, provided that the WCD is arranged to receive and implement the access-toggle flag/logic. By way of example, the access control server 52 may transmit the access-toggle flag/logic to the WCD by commanding the OTAP server 48 to send the access-toggle flag/logic to the WCD. This is a convenient implementation method, given that the WCD is preferably already arranged to receive, trust, and implement service updates from the OTAP server 48. As another example, however, the WCDs could be manually programmed with the access-toggle flag/logic, e.g., by a wireless carrier technician or enterprise information-technology person. This type of provisioning may not work well for embedded telemetry devices but may work well for other types of devices.

The present method can be usefully implemented in a scenario where the service authorization of a WCD is being terminated. In that case, the access control server 52 preferably transmits the access-toggle flag/logic to the WCD before the authorization of the WCD is actually terminated, so that the transmission of the access-toggle flag/logic to the WCD can occur successfully. For instance, in response to determining that the service authorization of the WCD is to be terminated, the access control server 52 may first command OTAP server 48 to transmit the access-toggle flag/logic to the WCD. Once that transmission is successfully completed, the access control server 52 may then command the authorization server 46 to terminate the service authorization for the WCD, and the authorization server 46 would do so. At that point, the WCD would be de-authorized but would be advantageously provisioned with the access-toggle flag/logic so that the WCD will not attempt access when and where the RAN is broadcasting the access-off command but may attempt access when and where the RAN is not broadcasting the access-off command (or is broadcasting an access-on command).

The method can also apply, however, even for WCDs that are not having their service authorization terminated. For instance, there may be a particular class of WCDs (such as WCDs with inexpensive or otherwise low service-level-agreements or the like) that the wireless carrier would like to restrict from attempting access at certain times or in certain coverage areas. To facilitate that, the access control server 52 may cause each such WCD to be provisioned with the access-toggle flag/logic, even though the WCDs remain authorized to be served by the wireless carrier, while allowing other WCDs of the wireless carrier to not be subject to access-toggling or to be subject to a lesser extent of access-toggling. When and where the wireless carrier's RAN then broadcasts the access-off command, those WCDs provisioned with the access toggle flag/logic will detect the access-off command and responsively not attempt access, while other WCDs that are not provisioned with the access-toggle flag/logic may freely attempt access.

The access-toggle flag/logic may take any of a variety of forms. By way of example, the access-toggle flag/logic may be simply a Boolean flag or value that the WCD is programmed to treat as an indication that it is subject to access toggling. This would assume that the WCD has other logic in place to treat the flag in that manner. Alternatively, the access-toggle flag/logic may include that additional logic, such as program logic (e.g., firmware or software) that is executable by a processor of the WCD to cause the WCD to check for an access-off command before attempting access, and to not attempt access if an access-off command is provided by the RAN. The access-toggle flag/logic may take other forms as well. Further, the access-toggle flag/logic provided to one WCD may differ in form or substance from the access-toggle flag/logic provided to another WCD. For instance, the access-toggle flag/logic may itself define its scope of use, such as times or other situations in which the WCD is to apply access-toggling (i.e., is to heed any access-off command broadcast by the RAN).

An WCD that is provisioned with the access-toggle flag/logic will preferably be arranged to check for the existence of an access-off command (expressly, or by the absence of an access-on command) before deciding to attempt access in a given coverage area. As noted above, the access-off command may be broadcast by the RAN in a system parameter message of the type that WCDs are generally arranged to read before they attempt access. For instance, the access-off command may be provided as a parameter in a newly defined field of such a message, provided that the WCDs provisioned with the access-toggle flag/logic would be arranged to read that field and treat the parameter as an access-off command. Further, as noted above, providing the access-off command may be accomplished by not providing an access-on command, or in some other manner. Alternatively, the access-off command may be broadcast by the RAN in some other manner.

In any event, when a WCD that is provisioned with the access-toggle flag/logic is going to attempt access (e.g., to register upon detecting coverage of the RAN), the WCD will first determine whether the RAN is providing the access-off command. If the WCD detects that the RAN is providing the access-off command, the WCD will forego transmission of an access probe to the RAN, thus helping to conserve valuable access channel resources. Whereas, if the WCD does not detect that the RAN is providing the access-off command, the WCD will transmit an access probe to the RAN. On the other hand, any WCD that is not provisioned with the access-toggle flag/logic and that is going to attempt access will freely do so, ignoring or not even reading an access-off command that is broadcast by the RAN.

In practice, the RAN will be arranged to broadcast an access-off command when and where the RAN is to prevent access attempts by WCDs that are provisioned with the access-toggle flag/logic while allowing other WCDs to freely attempt access. Any aspect of the RAN may be programmed with logic to facilitate this. For instance, RNC 36 may be programmed with such logic and/or each of the BTSs may be programmed with such logic. In accordance with the logic, when the RAN is to broadcast the access-off command in a particular coverage area, the BTS that radiates to define that coverage area will include the access-off command in a broadcast message in a manner that WCDs provisioned with the access-toggle flag/logic are arranged to detect.

As noted above, the access control server 52 may in some manner control when and where the RAN broadcasts the access-off command, so as to manage RAN access attempts. For instance, the access control server 52 may transmit control commands to RNC 36 and/or to one or more BTSs to arrange for transmission of the access-off command at particular times and in particular locations, and/or in response to particular conditions or other triggering events. Alternatively or additionally, RNCs and/or BTSs may be programmed in other ways with logic that dictates when and where to broadcast access-off commands. Still further, access-off command transmission may be focused on a particular cell sector, a cell, an RNC coverage area, an MSC coverage area, the entire RAN, or some other scope.

Optimally, the RAN may be arranged to broadcast the access-off command in a coverage area in response to determination that access channel occupancy in the coverage area is greater than a defined threshold. Access channel occupancy may be measured as a ratio of occupied access channel slots to total number of access channel slots, over time, or may be measured in some other manner. Alternatively or additionally, the RAN may be arranged to broadcast the access-off command in a coverage area in response to some other metric that represents heavy load, such as high noise on the air interface for instance.

For instance, the RAN may broadcast the access-off command in coverage area 16 and not in coverage area 18, or the RAN may broadcast the access-off command in both coverage area 16 and coverage area 18. Other examples are possible as well.

As noted above, the present method can be usefully employed to prevent terminated embedded telemetry devices from attempting access in the RAN and thus from consuming valuable access channel resources. In practice, for instance, when the wireless carrier terminates an arrangement with a fleet company for the fleet company's trucks 30, 32, 34 to carry drive-test units 20, 22, 26, it may be difficult to remove those drive-test units from the company's trucks or even to disconnect them from the trucks' power supplies. In accordance with the present method, before the wireless carrier formally de-authorizes those drive-test units, the carrier may provision each of the drive-test units with the access-toggle flag/logic. Once the drive-test units are then de-authorized, they would no longer attempt access in coverage areas where the RAN is providing the access-off command, while other WCDs 24, 28 that are not provisioned with the access-toggle flag/logic will freely attempt access in those coverage areas. Advantageously, if the wireless carrier then desires to reinstate the drive-test arrangement with the fleet company, the wireless carrier may then discontinue broadcasting of the access-toggle flag/logic in the region where the trucks would travel, so that the drive-test units would then attempt access once again.

Figure 2:
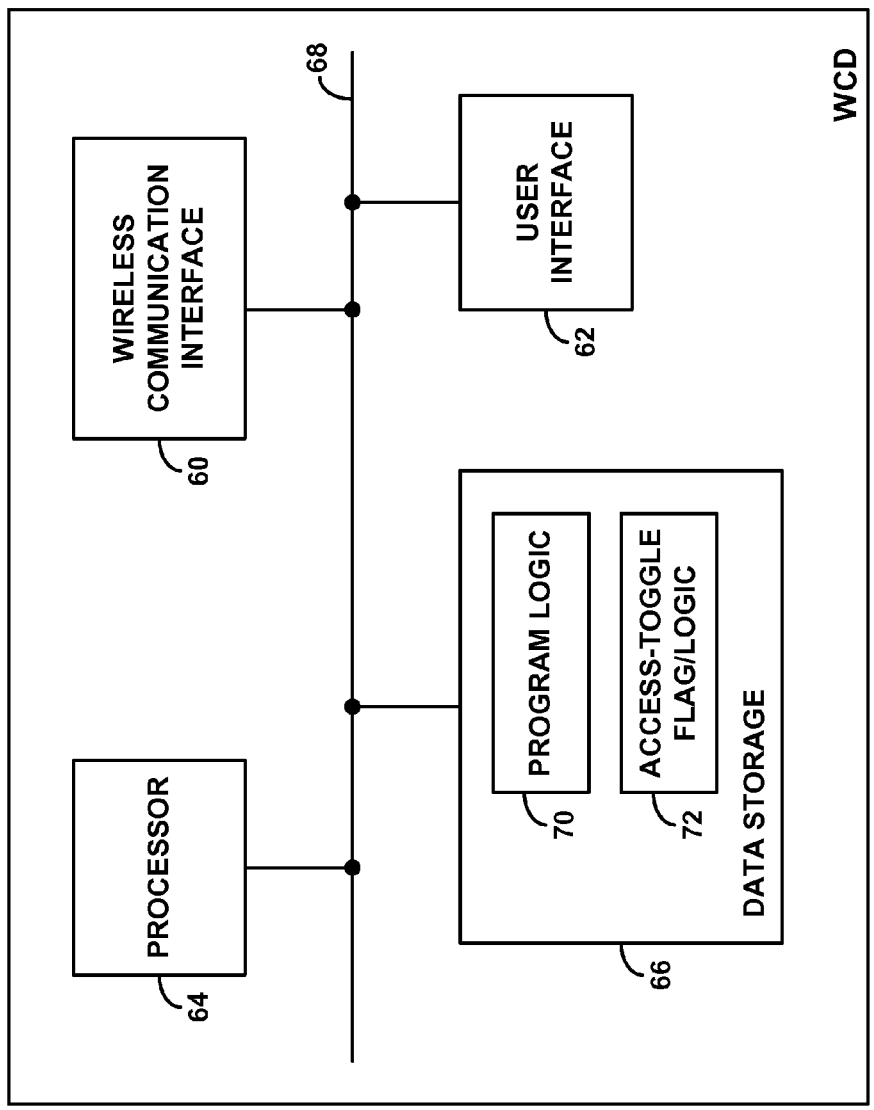
FIG. 2 is a simplified block diagram of an access control server operable within the system of FIG. 1.

FIG. 2 is next a simplified block diagram of an exemplary WCD operable within the exemplary method. As shown, the WCD includes a wireless communication interface 60, user interface 62, a processor 64, and data storage 66, all of which may be communicatively linked together by a system bus or other connection mechanism 68.

Generally, wireless communication interface 60 provides for wireless communication with BTSs according to an agreed air interface protocol, such a one of those noted above for instance. As such, wireless communication interface 60 may comprise a cellular chipset such as one made by Qualcomm Incorporated, together with one or more antennas. The wireless communication interface will preferably enable the WCD to detect pilot signals indicating the existence of wireless coverage, to read a sync channel message or the like so as to determine operational parameters, and to transmit access probes to carry registration requests and origination requests for instance. The wireless communication interface 60 may then be further arranged to implement functions of the present method, such as receiving and implementing the access-toggle flag/logic and thus determining whether the RAN is broadcasting an access-off command and foregoing transmission of an access probe if so. Alternatively or additionally, this logic could be implemented by processor 64.

User interface 62 facilitates interaction with a user of the WCD, if applicable. As such, the user interface may include input components such as a keypad, a touch-screen, a microphone, and a camera, and the user interface may include output components such as a display screen, a loud speaker, and a headset interface.

Processor 64 comprises one or more general purpose processors (e.g., INTEL microprocessors) and/or one or more special purpose processors (e.g., digital signal processors or application specific integrated circuits) and may be integrated in whole or in part with wireless communication interface 60 or with other aspects of the WCD.

Data storage 66 in turn comprises one or more volatile and/or non-volatile storage components, such as magnetic, optical, or organic storage and may be integrated in whole or in part with processor 64. As shown, data storage 66 of the WCD may include program logic 70 executable by processor 64 to carry out various WCD functions described herein. As such, the data storage may receive and hold the access-toggle flag/logic 72, and, in accordance with the access-toggle flag/logic 72 the WCD may forego transmission of an access probe when and where the WCD detects that the RAN is broadcasting an access-off command but may freely transmit an access probe when and where the WCD does not detect that the RAN is not broadcasting the access-off command.

Figure 3:
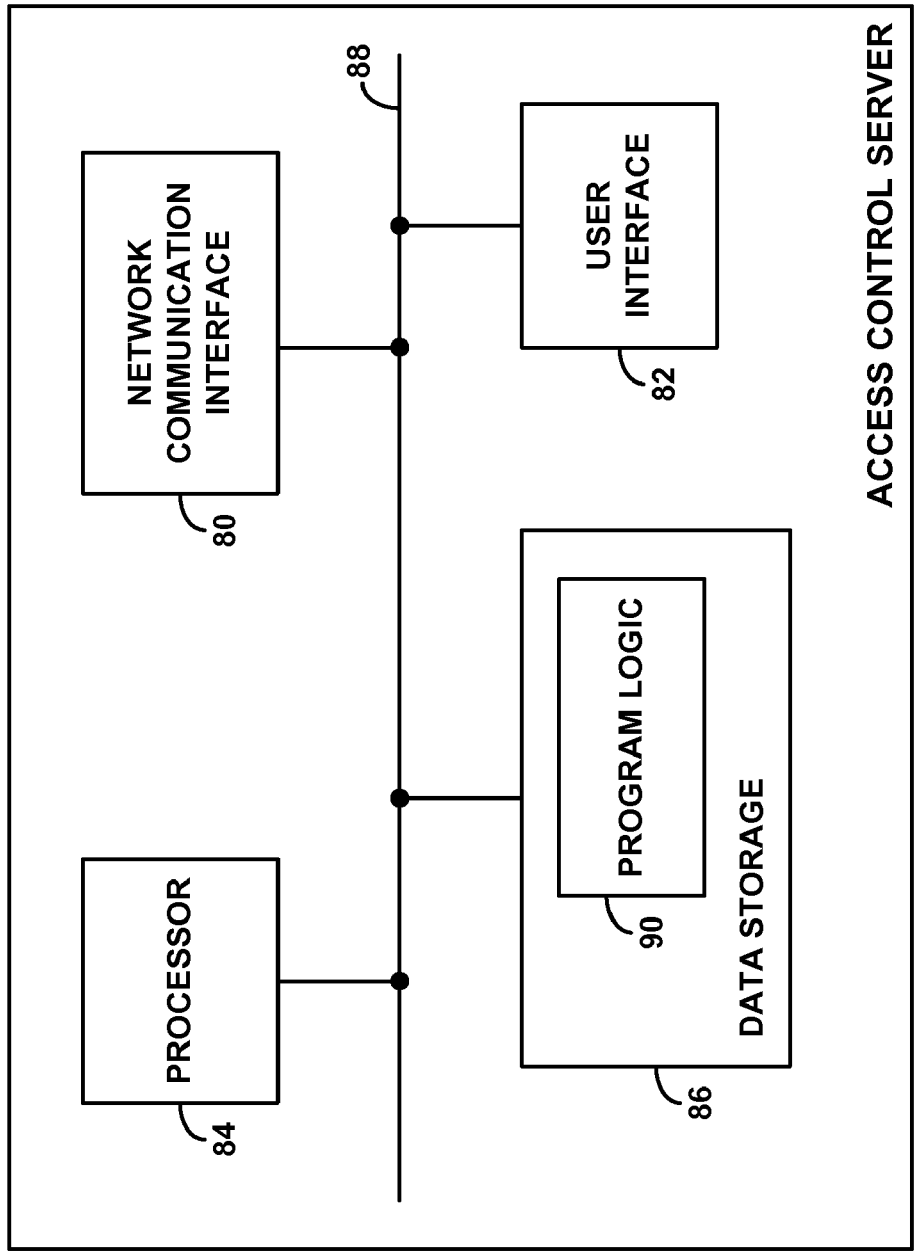
FIG. 3 is a simplified block diagram of a WCD operable within the system of FIG. 1.

FIG. 3 is next a simplified block diagram of an exemplary access control server 52 operable within the exemplary method. As shown, the access control server 52 includes a network communication interface 80, a user interface 82, a processor 84, and data storage 86, all of which may be communicatively linked together by a system bus or other connection mechanism 88.

Network communication interface 80 generally facilitates connection of access control server 52 with a network through which the access control server can communicate with other entities, such as to transmit the access-toggle flag/logic to a proper subset of the wireless carrier's subscriber WCDs, and to transmit commands to RAN infrastructure to trigger broadcast of access-off commands in particular coverage areas and at particular times. By way of example, network communication interface 80 may comprise a wired or wireless Ethernet network interface module that allows access control server 52 to sit as a node on packet-switched network 42.

User interface 82 facilitates interaction with a user of the access control server, if applicable. As such, user interface 82 may comprise input and output components such a keyboard, display, and pointing device. Other examples are possible as well.

Processor 84 comprises one or more general purpose processors (e.g., INTEL microprocessors) and/or one or more special purpose processors (e.g., digital signal processors or application specific integrated circuits) and may be integrated in whole or in part with network communication interface 80 or with other aspects of the access control server.

Data storage 86 in turn comprises one or more volatile and/or non-volatile storage components, such as magnetic, optical, or organic storage and may be integrated in whole or in part with processor 84. As shown, data storage 86 of the access control server may include program logic 90 executable by processor 84 to carry out various access control server functions described herein.

Figure 4:
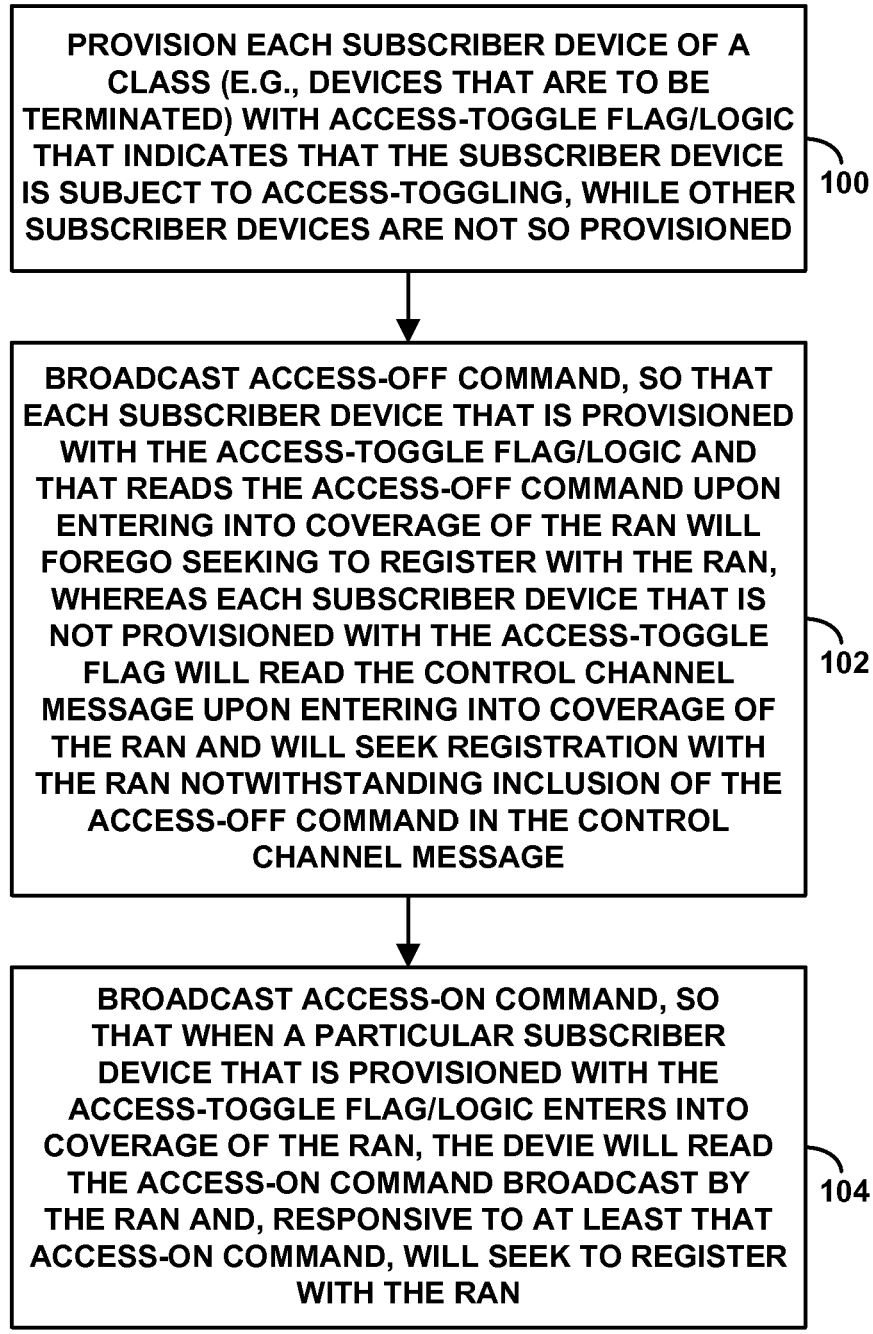
FIG. 4 is a flow chart depicting functions that can be carried out in accordance with the present disclosure.

FIG. 4 is next a flow chart depicting functions that can be carried out in accordance with the exemplary method. The method assumes that a RAN operated by a wireless carrier is arranged to serve a plurality of subscriber devices that subscribe to service of the wireless carrier. In normal operation, the RAN may broadcast an air interface control channel message (e.g., sync message) that subscriber devices read upon entering into coverage of the RAN (e.g., powering on in coverage of the RAN or moving into coverage of the RAN). Further, the RAN defines at least one air interface access channel through which subscriber devices seek to register with the RAN.

The method provides for selectively restricting a class of the wireless carrier's subscriber devices (e.g., a proper subset of the subscriber devices) from registering with the RAN (e.g., attempting access) while allowing other subscriber devices to register with the RAN.

According to the method, as shown at block 100, each subscriber device of the class is provisioned with an access-toggle flag (e.g., a Boolean flag and/or more complex toggle logic) that indicates that the subscriber device is subject to access-toggling. On the other hand, each subscriber device that is not a member of the class is not provisioned with the access-toggle flag.

At block 102, the RAN then includes in its broadcast message an access-off command, which impacts the subscriber devices that are provisioned with the access-toggle flag but does not impact the other subscriber devices. In particular, each subscriber device that is provisioned with the access-toggle flag and that reads the access-off command in the control channel message upon entering into coverage of the RAN will forego seeking to register with the RAN, whereas each subscriber device that is not provisioned with the access-toggle flag will read the control channel message upon entering into coverage of the RAN and will seek registration with the RAN (in normal course when appropriate) notwithstanding inclusion of the access-off command in the control channel message.

At block 104, the RAN then broadcasts an access-on command, which causes at least one subscriber device that is subject to access-toggling to no longer forego seeking to register with the RAN. In particular, when a particular subscriber device that is provisioned with the flag enters into coverage of the RAN, the device will read the access-on command broadcast by the RAN and, responsive to at least that access-on command (and perhaps responsive to a specific registration trigger), will seek to register with the RAN.

It should be understood that the details described above are provided merely by way of example and therefore should not be considered limiting. For instance, other arrangements and other elements (e.g., machines, interfaces, functions, orders of functions, etc.) can be used instead and some elements may be omitted altogether. Further, those skilled in the art will appreciate that many of the elements described herein are functional entities that may be implemented as discrete components or in conjunction with other components, in any suitable combination and location, and that various functions described can be implemented by hardware, firmware, and/or software.

More generally, although an exemplary embodiment has been described above, those skilled in the art will understand that changes and modifications may be made to the embodiment described without departing from the true scope and spirit of the invention.

What is claimed is:

1. In a system in which a radio access network (RAN) is operated by a wireless carrier, a method comprising:
   the RAN serving with wireless communication service a plurality of subscriber devices that subscribe to service of the wireless carrier;
   provisioning each subscriber device of a proper subset of the plurality with a flag indicating that the subscriber device is subject to access-toggling, wherein each remaining subscriber device of the plurality is not provisioned with the flag; and
   the RAN broadcasting an access-off command, wherein the access-off command that is broadcast by the RAN is received by subscriber devices of the plurality including one or more subscriber devices provisioned with the flag and one or more subscriber devices not provisioned with the flag, wherein each subscriber device that thereby receives the access-off command (i) disregards the access-off command if the subscriber device is not provisioned with the flag and (ii) responds to the access-off command by not seeking to register with the RAN if the subscriber device is provisioned with the flag.

2. The method of claim 1, wherein broadcasting the access-off command comprises broadcasting the access-off command in an air interface control channel message that subscriber devices read upon entering into coverage of the RAN.

3. The method of claim 2, wherein the air interface control channel message comprises a sync channel message.

4. The method of claim 1, wherein the proper subset of the plurality of subscriber devices comprises embedded telemetry devices, the method further comprising:
   the wireless carrier terminating a service account for a given such embedded telemetry device, and, as part of the terminating, the wireless carrier performing the provisioning of the given embedded telemetry device with the flag, so that the given telemetry device will thereafter not seek to register with the RAN when and where the RAN is broadcasting the access-off command, although at least one other subscriber device that is not so provisioned with the flag will seek to register with the RAN even when and where the RAN is broadcasting the access-off command.

5. The method of claim 1, wherein provisioning each subscriber device of the proper subset of the plurality with the flag comprises engaging in over-the-air provisioning of the subscriber device to provide the subscriber device with the flag.

6. The method of claim 1, wherein the flag comprises a Boolean flag.

7. The method of claim 1, further comprising:
   the RAN subsequently broadcasting an access-on command, wherein when a particular subscriber device that is provisioned with the flag enters into coverage of the RAN, the particular subscriber device reads the access-on command broadcast by the RAN and, responsive to at least the access-on command, seeks to register with the RAN.

8. In a system in which a radio access network (RAN) is operated by a wireless carrier, wherein the RAN broadcasts an air interface control channel message that subscriber devices read upon entering into coverage of the RAN, and wherein the RAN communicates on at least one air interface access channel through which subscriber devices seek to register with the RAN, a method of selectively restricting a class of subscriber devices from registering with the RAN while allowing other subscriber devices to register with the RAN, the method comprising:
   provisioning each subscriber device of the class with an access-toggle flag that indicates the subscriber device is subject to access-toggling, wherein each subscriber device that is not a member of the class is not provisioned with the access-toggle flag; and
   the RAN including in the broadcast control channel message an access-off command, wherein each subscriber device that is provisioned with the access-toggle flag and that reads the access-off command in the control channel message upon entering into coverage of the RAN will forego seeking to register with the RAN, whereas each subscriber device that is not provisioned with the access-toggle flag will read the control channel message upon entering into coverage of the RAN and will seek registration with the RAN notwithstanding inclusion of the access-off command in the control channel message.

9. The method of claim 8, wherein the air interface control channel message comprises a sync channel message.

10. The method of claim 8, wherein the class of subscriber devices comprises embedded telemetry devices, the method further comprising:
the wireless carrier terminating a service account for a given such embedded telemetry device, and, as part of the terminating, the wireless carrier performing the provisioning of the given embedded telemetry device with the access-toggle flag, so that the given telemetry device will thereafter not seek to register with the RAN when and where the RAN is broadcasting the access-off command, whereas at least one other subscriber device that is not so provisioned with the access-toggle flag will seek to register with the RAN even when and where the RAN is broadcasting the access-off command.

11. The method of claim 8, wherein provisioning each subscriber device of the class with the access-toggle flag comprises engaging in over-the-air provisioning of the subscriber device to provide the subscriber device with the access-toggle flag.

12. The method of claim 8, wherein the access-toggle flag comprises a Boolean flag.

13. The method of claim 8, further comprising:
the RAN subsequently broadcasting an access-on command, wherein when a particular subscriber device that is provisioned with the access-toggle flag enters into coverage of the RAN, the particular subscriber device reads the access-on command broadcast by the RAN and, responsive to at least the access-on command, seeks to register with the RAN.

14. In a system in which a radio access network (RAN) is operated by a wireless carrier, a method comprising:
terminating a service account that a given subscriber device has with the wireless carrier for the given subscriber device to be served by the RAN;
as part of the terminating, provisioning the given subscriber device with access-toggle logic, wherein at least one other subscriber device that has a service account with the RAN is not provisioned with the access-toggle logic; and
the RAN broadcasting an access-off command to restrict registration with the RAN,
wherein upon receipt of the access-off command by the given subscriber device, the access-toggle logic is executable by the given subscriber device to cause the given subscriber device to not seek registration with the RAN, and
wherein upon receipt of the access-off command by the other subscriber device, the other subscriber device disregards the access-off command.

15. The method of claim 14, wherein the given subscriber device is an embedded telemetry device, whereby the method operates to prevent the embedded telemetry device from attempting to register with the RAN upon entry into coverage of the RAN when the embedded telemetry device detects the access-off command broadcast by the RAN.

16. The method of claim 14, further comprising provisioning the given subscriber device with a preferred roaming list that causes the given subscriber device to scan for coverage of the RAN, wherein, upon the given subscriber device thereby detecting coverage of the RAN, the access-toggle logic causes the given subscriber device to decline to send a registration message to the RAN.

17. The method of claim 14, further comprising:
subsequent to RAN broadcasting the access-off command, the RAN broadcasting an access-on command, which, when detected by the given subscriber device, causes the given subscriber device to operate in a mode in which the given subscriber device seeks registration with the RAN.

18. The method of claim 14, wherein broadcasting the access-on command comprises broadcasting the access-on command in an air interface control channel message that subscriber devices, including the given subscriber device and the other subscriber device, are each arranged to read upon entry into coverage of the RAN.

19. The method of claim 18, wherein the air interface control channel message comprises a sync channel message.

20. The method of claim 14, wherein provisioning the given subscriber device with the access-toggle logic comprises provisioning the given subscriber device with the access-toggle logic via over the air service provisioning of the given subscriber device.

* * * * *